United States Patent
Shimizu (12)

(10) Patent No.: US 6,424,386 B1
(45) Date of Patent: Jul. 23, 2002

(54) LIQUID CRYSTAL DISPLAY DEVICE

(75) Inventor: Toshiyuki Shimizu, Tokyo (JP)

(73) Assignee: Jamco Corporation, Tokyo (JP)

( * ) Notice: Subject to any disclaimer, the term of this patent is extended or adjusted under 35 U.S.C. 154(b) by 0 days.

(21) Appl. No.: 09/288,301

(22) Filed: Apr. 8, 1999

(30) Foreign Application Priority Data

Jan. 25, 1999 (JP) .......................................... 11-015313

(51) Int. Cl.$^7$ ................................................ H04H 5/64
(52) U.S. Cl. .................. 348/837; 312/223.1; 312/319.7
(58) Field of Search ................................. 348/837, 836; 312/7.2, 319.7, 223.1

(56) References Cited

U.S. PATENT DOCUMENTS 5,096,271 A * 3/1992 Portman ..................... 312/7.2
5,467,106 A * 11/1995 Salomon ...................... 345/87
5,583,735 A * 12/1996 Pease et al. ................. 312/7.2
5,743,487 A * 4/1998 Rice ........................... 312/7.2

* cited by examiner

*Primary Examiner*—Peter M. Cuomo
*Assistant Examiner*—Jerry A. Anderson
(74) *Attorney, Agent, or Firm*—Armstrong, Westerman & Hattori, LLP

(57) ABSTRACT

A liquid crystal display device 1 comprising a housing 100 is mounted to a ceiling member of an airplane. An image control unit 110 is fixed to the housing 100, and a liquid crystal display 300 is fixed to a main shaft positioned at a center of rotation $C_1$, so as to be driven to the arrow $R_1$ direction. In a retracting unit, a liquid crystal panel 310 of the liquid crystal display 300 is opposed to the image control unit 110, and stored inside a cover 2,00 surrounding the housing 100. The whole height $H_1$ of the liquid crystal display device 1 may be reduced, so as to secure the overhead clearance of the passengers.

6 Claims, 7 Drawing Sheets

LIQUID CRYSTAL DISPLAY DEVICE

BACKGROUND OF THE INVENTION

1. Field of the Invention

The present invention relates to a liquid crystal display device to be equipped on the ceiling in the cabin of an airplane, which may be retracted when not in use.

2. Description of the Prior Art

Many types of display devices are used in the cabin of an airplane for displaying video images and the like, which include a CRT television, a projector for projecting images onto a screen, or a small liquid crystal display equipped on the passenger seats.

Since liquid crystal displays are light in weight compared to the CRT television, it is suited for use on the airplane. A large screen liquid crystal display which may be viewed from a plurality of passenger seats is also proposed.

For example, U.S. Pat. No. 5,096,271 discloses a retractable display device, and U.S. Pat. No. 5,467,106 discloses a retraction structure of the display.

Moreover, U.S. Pat. Nos. 5,583,735 and 5,743,487 also disclose similar retractable display devices.

SUMMARY OF THE INVENTION

The present invention aims at providing an improved liquid crystal display device to be equipped in the cabin of an airplane.

The liquid crystal display device according to the present invention comprises, as a basic composition, a housing, a cover surrounding the housing, a liquid crystal display mounted to the housing revolvably between a retracted position and an evolved position, a control unit of the liquid crystal display, a drive unit of the liquid crystal display, and a control unit of the drive unit, wherein a liquid crystal panel of the liquid crystal monitor is placed, at said retracted position, so as to oppose to the control unit of the liquid crystal display being fixed to the housing. Further, the drive unit of the liquid crystal display is equipped with a motor, a reduction gear for reducing the output of the motor, an intermediate shaft driven by the output of the reduction gear, two coil-springs arranged in parallel to the intermediate shaft, a main shaft connected through a gear to the intermediate shaft, an arm mounted on the main shaft, and a bracket for mounting a liquid crystal display supported revolvably by said arm.

The liquid crystal display device further comprises a sensor for detecting the revolution of the liquid crystal display against said supporting arm.

Moreover, the drive unit of the liquid crystal display is equipped with a motor, a first one-way clutch transmitting only the forward direction rotation of the motor, a clutch to which the output of the first one-way clutch is inputted, a reduction gear to which the output of the clutch is inputted, an intermediate shaft driven by the output of the reduction gear, two coil-springs arranged in parallel to the intermediate shaft, a main shaft driven by the intermediate shaft, and a liquid crystal display supported by the main shaft, and the liquid crystal display is driven from the retracted position to the evolved position by the driving force of said motor, and driven from the evolved position to the retracted position by the spring force of said coil-springs.

The liquid crystal display device further comprises a second one-way clutch to which the output of said clutch is inputted, and a brake to which the output of said second one-way clutch is inputted, wherein the brake generates a braking force when the power supply to the liquid crystal display device is stopped, and the second one-way clutch transmits the braking force to the movement of the liquid crystal display toward the evolving direction. The liquid crystal display device further comprises a device for releasing the operation of the brake manually.

Even further, the liquid crystal display device comprises a third one-way clutch to which the output of the clutch is inputted, and a damper to which the output of the third one-way clutch is inputted, wherein the third one-way clutch transmits the movement of the liquid crystal display toward the retracting direction to the damper.

PREFERRED EMBODIMENT OF THE INVENTION

Figure 1:
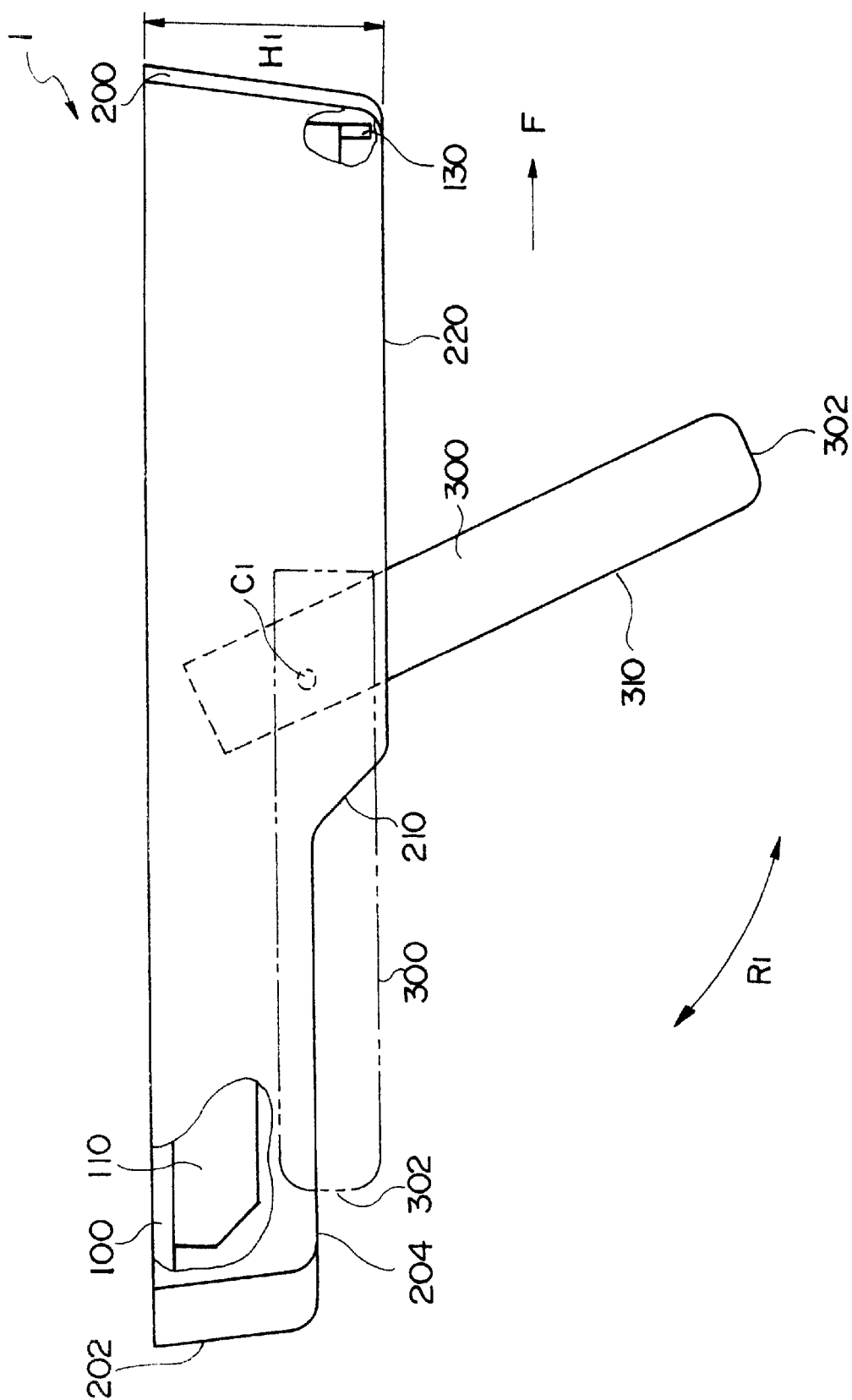
FIG. 1 is a side view of the liquid crystal display device according to the present invention.
Figure 2:
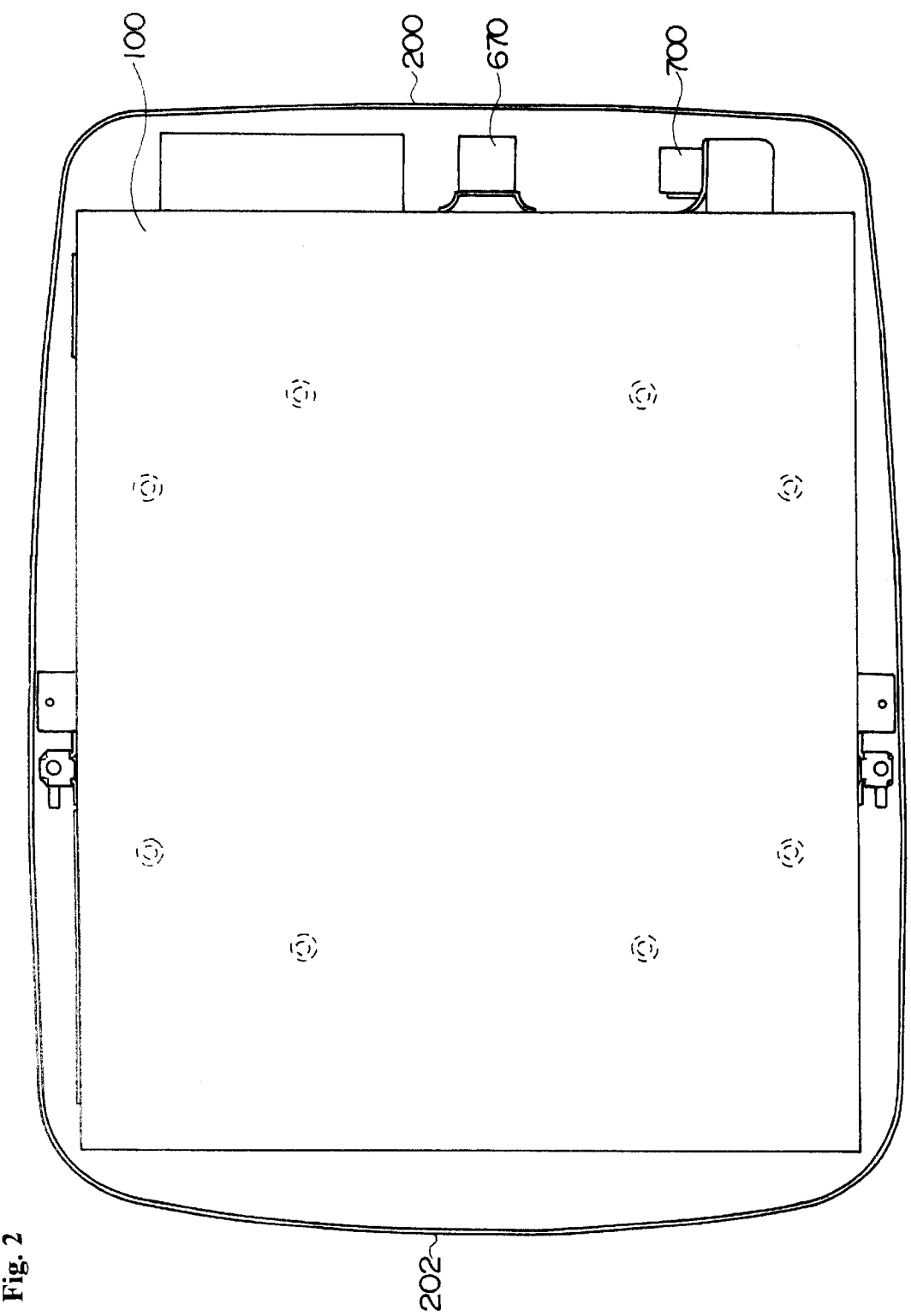
FIG. 2 is a plan view of the liquid crystal display device according to the present invention.
Figure 3:
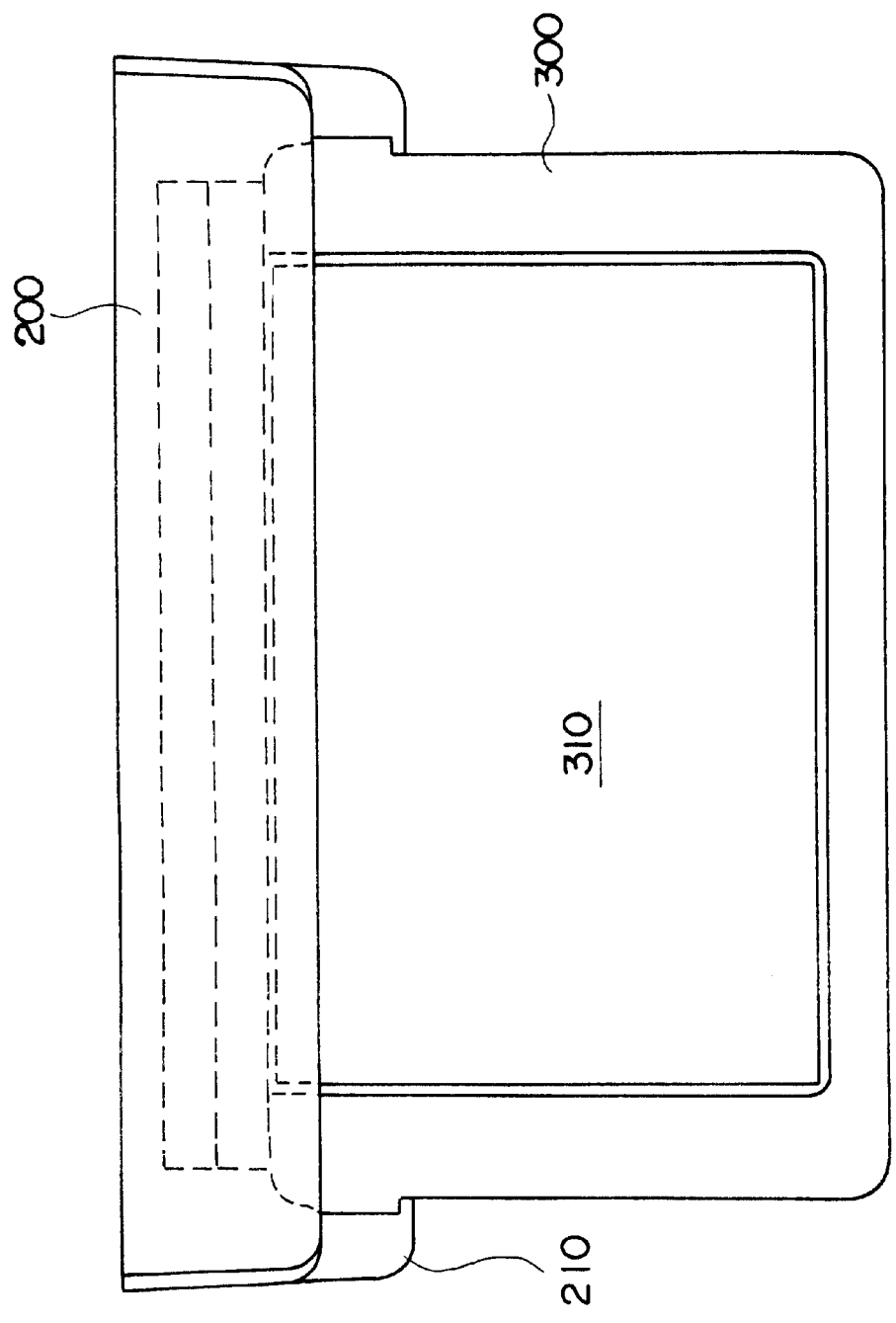
FIG. 3 is a front view of the liquid crystal display device according to the present invention.

FIG. 1 is a side view of a liquid crystal display device according to the present invention, FIG. 2 is a plan view, and FIG. 3 is a front view of the liquid crystal display.

The liquid crystal display device shown as a whole by the reference number 1 has a housing 100, and the display is mounted onto a structural member of the cabin ceiling in an airplane through the housing 100. The portion of the housing 100 exposed to the side of the cabin is covered by a cover 200, so as to provide an aesthetic appearance.

A liquid crystal display 300 is revolvably mounted to the housing 100 in the arrow $R_1$ direction with a center of rotation $C_1$.

In FIG. 1, the continuous line shows the state where the liquid crystal display 300 is evolved to an application position, and the two point chain line shows the state where the display 300 is retracted to the retracted position. A liquid crystal panel 310 of the liquid crystal display 300 is mounted to the display 300 in the direction opposite to the forward direction of the airplane shown by the arrow F. The liquid crystal panel 310 displays video images to passengers seated toward the rear of the airplane from the display 310.

The cover 200 is formed so that a rim portion 202 on the rear direction of the plane has a center portion which is curved and expanded. As could be seen from the side view, the cover also has a slanted portion 210 positioned toward the rear of the plane from the center of rotation $C_1$ of the liquid crystal display 300, enabling a user to visibly check the retracted state of the display 300.

A control unit 110 including image processing circuits and the like is mounted to the housing 100 in the area opposing to the retracted position of the liquid crystal display. The display 300 is supported at the retracted position so that it is stored inward from a lower surface 220 of the cover 200. Therefore, the total height $H_1$ of the liquid crystal display device may be reduced, so as to provide only a minimum effect to the overhead space of the passengers.

Moreover, a manual release button 130 and the like may be formed to the end portion of the liquid crystal display device 1 toward the front of the plane.

Figure 4:
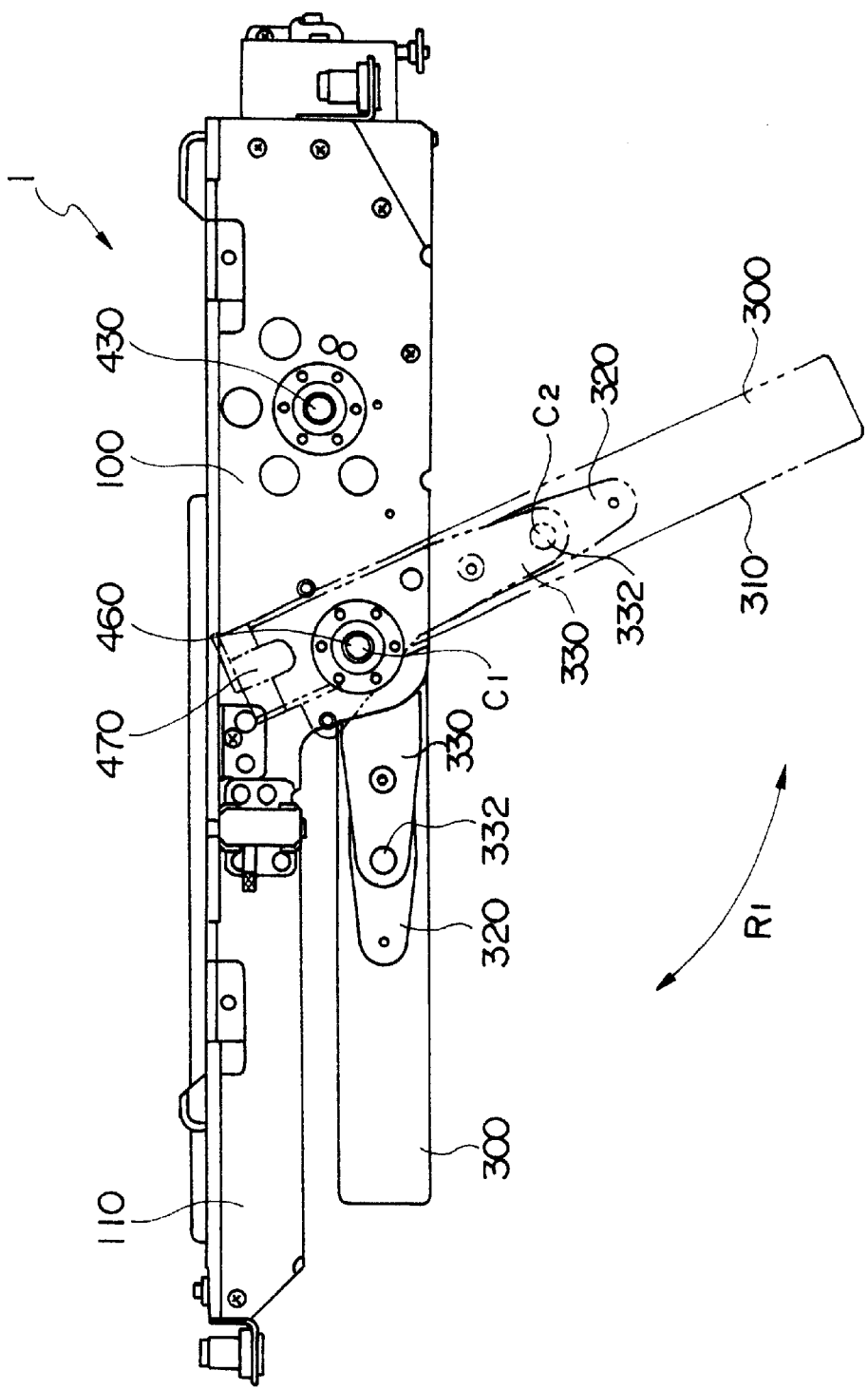
FIG. 4 is a side view showing the liquid crystal display device with the cover removed.
Figure 5:
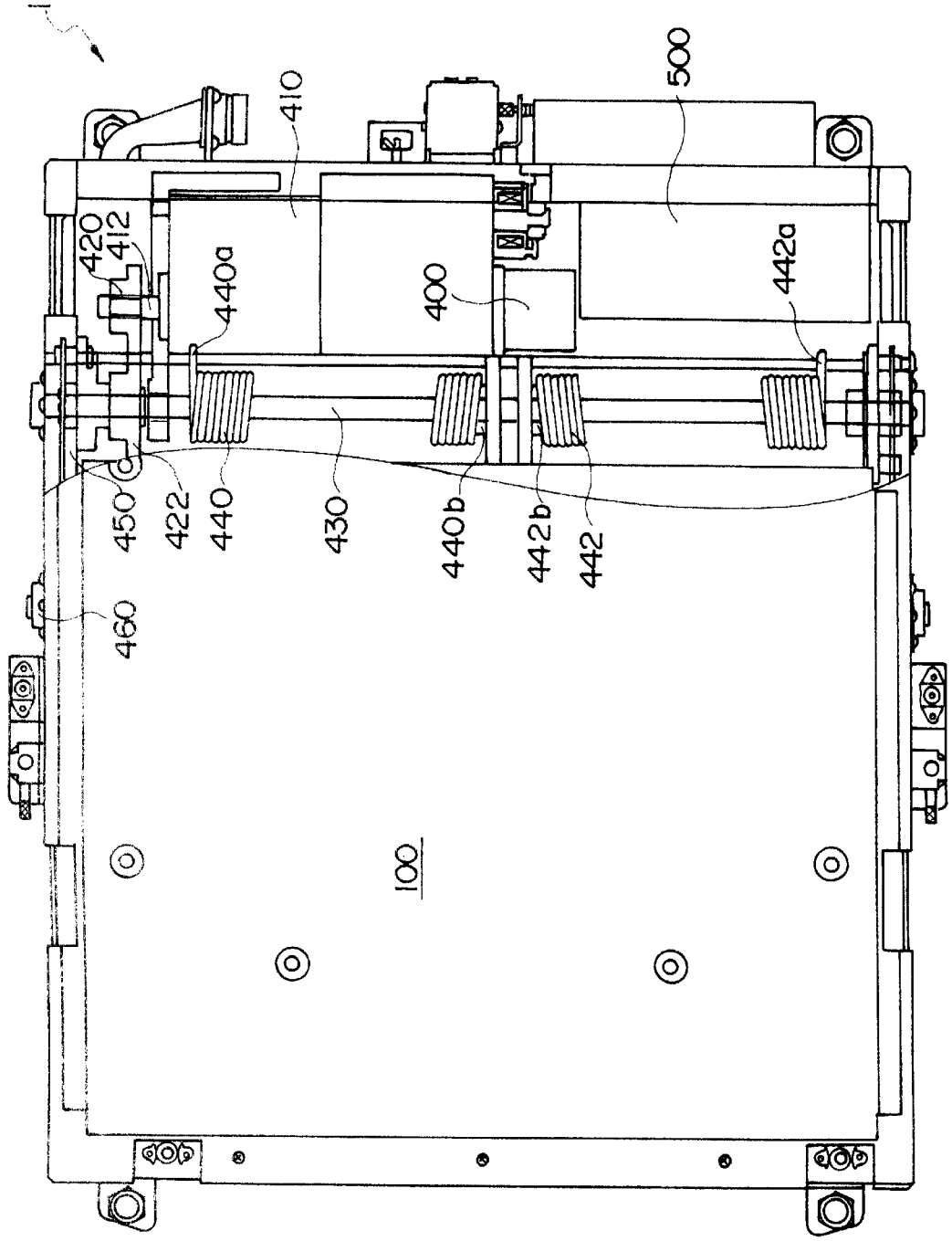
FIG. 5. is a partially cross-sectional plan view showing the liquid crystal display device with the cover removed.

FIG. 4 is a side view showing the state where the cover 200 of the liquid crystal display device 1 is removed, and FIG. 5 is a plan view showing the main portion in cross-section.

Brackets 320 are mounted on the both side portions of the liquid crystal display 300. The bracket 320 is connected rockably to an arm 330 by a pin 332. The arm 330 is connected to a main shaft 460 which may be driven to rotate around a center of rotation $C_1$.

The liquid crystal display 300 is opened from the position shown by the continuous line toward the direction of the arrow for 100 to 120 degrees, so as to be maintained at a service position shown by the two dot chain line. A sensor 470 is mounted to the edge of the liquid crystal display 300, which detects the rocking movement of the liquid crystal display 300 against the pin 332 on the arm 330 caused by an external force provided to the liquid crystal display 300. When such movement is detected, the sensor transmits a signal to the control unit explained hereinafter, so as to stop the evolving movement of the liquid crystal display 300 and to return it to the retracted position.

In FIG. 5, the output of a motor 400 mounted inside a frame 100 is reduced by a reduction device 410, and sent to an output shaft 412. A gear 420 mounted to the output shaft 412 is interlocked with a gear 422 fixed to an intermediate shaft 430, and rotates the intermediate shaft 430.

Two coil-springs 440 and 442 are mounted in parallel to each other on the intermediate shaft 430. The first coil-spring 440 has one end portion 440a fixed to the side of the frame and the other end 440b mounted to the intermediate shaft, so as to generate a torsional moment. Similarly, the second coil-spring 442 generates a torsional moment between the frame-side end portion 442a and the intermediate shaft-side end portion 442b.

These two coil-springs 440 and 442 provide torque to the intermediate shaft 430 in the direction opposite to the driving force of the motor 400.

The intermediate shaft 430 is connected to the main shaft 460 through a link 450, so as to drive the arm 330 supporting the liquid crystal display 300.

Figure 6:
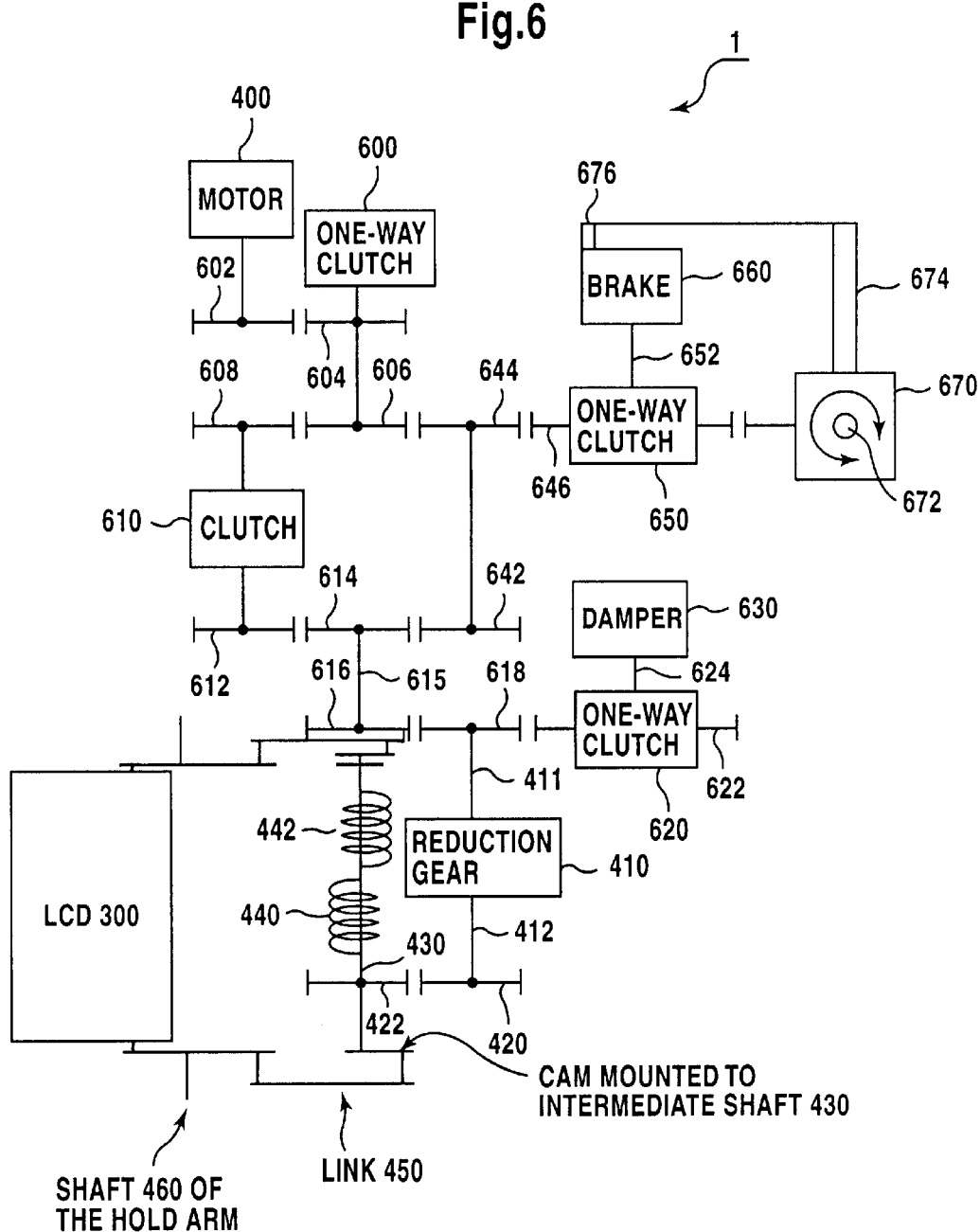
FIG. 6 is an explanatory view of the drive unit of the liquid crystal display device according to the present invention.

FIG. 6 is an explanatory view showing the composition of the drive unit of the liquid crystal display 1.

An output gear 602 of the motor 400 is interlocked to a gear 604 of a first one-way clutch. The first one-way clutch 600 transmits only the torque for driving the motor to the forward direction, and shuts out the torque for driving the motor 400 to the reverse direction.

A gear 606 on the output shaft of the first one-way clutch 600 is interlocked to an input gear 608 of a clutch 610. An output gear 612 of the clutch 610 is connected to an input shaft 411 of the reduction gear 410 through a gear 614 and shafts 615 and 616. The output shaft 412 of the reduction gear 410 is connected to the intermediate shaft 430 through gears 420 and 422. Two coil-springs 440 and 442 are equipped as mentioned above to the intermediate shaft 430.

The driving mechanism from the gear 422 on of the intermediate shaft 430 is explained in FIG. 5.

The gear 614 interlocked with the output gear 612 of the clutch 610 is also interlocked to a gear 642. The gear 642 is interlocked to a gear 646 of a second one-way clutch 650 through a gear 644. The second one-way clutch 650 is connected to a brake 660 through a shaft 652.

A gear 618 mounted to the input shaft 411 of the reduction gear 410 is interlocked to a gear 622 of a third one-way clutch 620. An output shaft 624 of the third one-way clutch 620 is connected to a damper 630.

Now, the operation of the drive unit in the liquid crystal display device according to the present invention is explained.

When the liquid crystal display device 1 is connected to a power through a connector 700, the brake 660 will be released electrically. Therefore, the brake 660 is operated when no power is provided to the liquid crystal display device 1, and the display 300 is locked in the state where it is stored inside the case.

When the order to drive the liquid crystal display 300 is transmitted from the control unit 500, the motor 400 is started. The output of the motor 400 is transmitted to the clutch 610. The clutch 610 is in a connected state, and the output of the clutch 610 is transmitted to the intermediate shaft 430 through the reduction gear 410.

The torque from the motor 400 transmitted to the intermediate shaft 430 rotates the intermediate shaft 430 opposing to the spring force of the two coil-springs 440 and 442. Thereby, the shaft 460 is driven, which revolves the liquid crystal display 300 to the evolved position.

When the display 300 is driven to the evolved position, the position of the display 300 is confirmed by a limit switch and the like, and the motor 400 is stopped.

The clutch 610 maintains a connected state, and the force of the coil-springs 440 and 442 working toward the direction to retract the liquid crystal display 300 is restrained by the first one-way clutch 600. According to such operation, the liquid crystal monitor 300 is maintained at the evolved position.

When moving the monitor 300 from the evolved position to the retracted position, the clutch 610 is released by the order from the control unit. By the release of the clutch 610, the spring force of the two coil-springs 440 and 442 moves the display 300 toward the retracting direction. This rotational force is inputted to the reduction gear 410 from the output shaft 412 of the reduction gear, and the gear 618 is rotated through the input shaft 411. This rotation is communicated to the one-way clutch 620 through the gear 622. The one-way clutch 620 transmits this input to the output shaft 624, and operates the damper 630.

The damper 630 adjusts the retracting speed of the liquid crystal display 300, so that the display is returned to the retracted position by a fixed angular velocity. The order to retract the liquid crystal display is also generated when the sensor 470 detects any contact of a person or other obstacles to the liquid crystal display.

The liquid crystal display 300 stored to the retracted position is maintained at such position by the spring force of two coil-springs 440 and 442. When the power supply to the liquid crystal display device 1 is stopped, the brake 660 is operated, and the display 300 is locked to the retracted position.

A manual lock release unit 670 is equipped to the device, so as to enable removal of the liquid crystal display device 1 from the airplane, or to manually evolve the display 300 while no power is provided thereto. The manual lock release unit 670 comprises a knob 672, for example, that may be rotated by a driver and the like. When the knob 672 is rotated, the brake 660 is release through link structures 674 and 676. Such operation enables the liquid crystal display 300 to be evolved manually.

Figure 7:
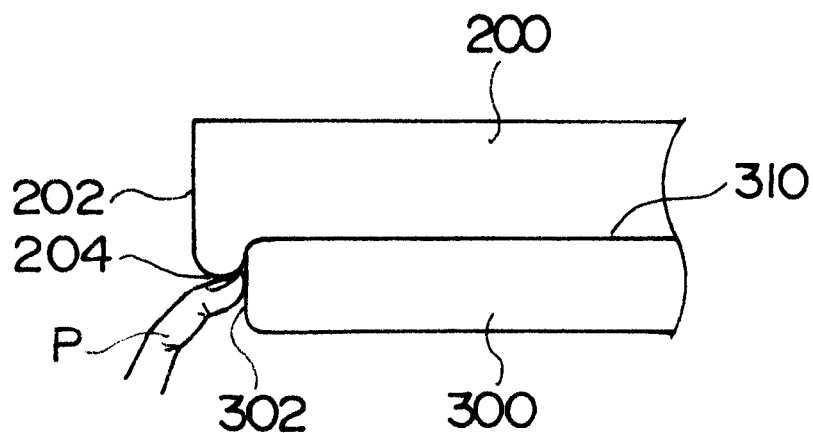
FIG. 7 is an explanatory view showing the operation of the liquid crystal display device according to the present invention.

As could be seen from FIGS. 1 and 7, when the liquid crystal display device 1 according to the present invention is placed in the retracted position, the front frame portion 302 of the liquid crystal display 300 is placed inward from the back frame 202 of the cover 200. Further, the liquid crystal screen portion 310 is placed inward from the lower frame portion 204 of the cover 200.

Figure 8:
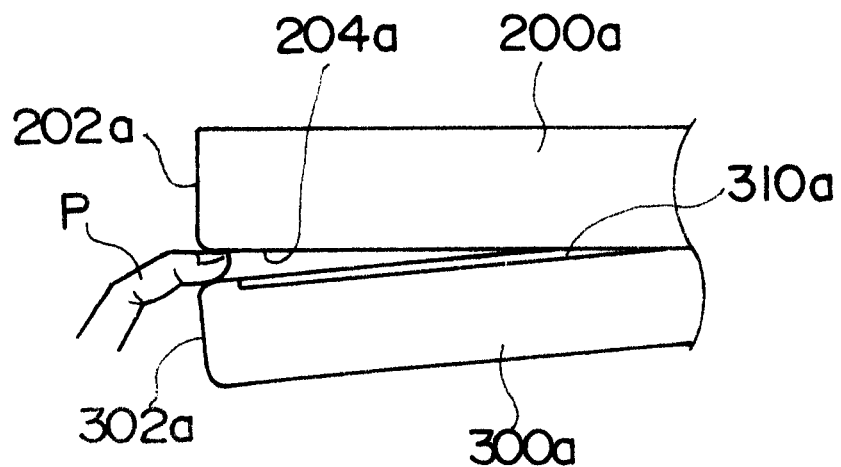
FIG. 8 is an explanatory view showing the operation of a conventional liquid crystal display device.

Such structure is safer than the structure shown in FIG. 8, where the back frame portion 202*a* of the cover 200*a* and the front frame portion 302*a* of the liquid crystal display 300*a* are aligned, and the lower frame portion 204*a* of the cover 200*a* and the screen surface 310*a* of the display 300*a* is superposed, which allows the fingers P of a user and the like to be inserted between the display 300*a* and the cover 200*a*.

The liquid crystal display device according to the present invention may be decreased in size of the overall height, which is effective in securing the overhead clearance of the passengers on the airplane. Moreover, the drive unit of the display is also compact in size, and it provides a reliable movement of the display. When the liquid crystal display may contact an obstacle, the display will automatically be returned to the retracted position.

I claim:

1. A liquid crystal display device comprising a housing, a cover surrounding said housing, a liquid crystal display mounted to said housing revolvably between a retracted position and an evolved position, a control unit of said liquid crystal display, a drive unit of said liquid crystal display, and a control unit of said drive unit;

wherein said drive unit of said liquid crystal display is equipped with a motor, a reduction gear for reducing an output of said motor, an intermediate shaft driven by said reduction gear, two coil-springs being co-axial with said intermediate shaft, a main shaft connected through a gear to said intermediate shaft, an arm mounted on said main shaft, and a bracket for mounting said liquid crystal display supported revolvably by said arm.

2. A liquid crystal display device according to claim 1, further comprising a sensor for detecting a rotation of said liquid crystal display against said supporting arm.

3. A liquid crystal display device comprising a housing, a cover surrounding said housing, a liquid crystal display mounted to said housing revolvably between a retracted position and an evolved position, a control unit of said liquid crystal display, a drive unit of said liquid crystal display, and a control unit of said drive unit;

wherein said drive unit of said liquid crystal display is equipped with a motor, a first one-way clutch transmitting only a forward rotation of said motor, a clutch to which an output of said first one-way clutch is inputted, a reduction gear to which an output of said clutch is inputted, an intermediate shaft driven by the output of said reduction gear, two coil-springs being co-axial with said intermediate shaft, a main shaft driven by said intermediate shaft, and a liquid crystal display supported by said main shaft; and said liquid crystal display is driven from said retracted position to said evolved position by a driving force of said motor, and driven from said evolved position to said retracted position by a spring force of said coil-springs.

4. A liquid crystal display device according to claim 3, further comprising a third one-way clutch to which an output of said clutch is inputted, and a damper to which an output of said third one-way clutch is inputted;

wherein said third one-way clutch transmits a force to move said liquid crystal display toward the retracting direction to said damper.

5. A liquid crystal display device according to claim 3, further comprising a second one-way clutch to which an output of said clutch is inputted, and a brake to which an output of said second one-way clutch is inputted;

wherein said brake generates a braking force when the power supply to said liquid crystal display device is stopped, and said second one-way clutch transmits said braking force to move said liquid crystal display toward the evolving direction.

6. A liquid crystal display device according to claim 5, further comprising a device for releasing an operation of the brake manually.

* * * * *